United States Patent
Gao (10) Patent No.: US 10,061,686 B2
(45) Date of Patent: Aug. 28, 2018

(54) METHOD, ELECTRONIC APPARATUS, SYSTEM, AND STORAGE MEDIUM FOR AUTOMATED TESTING OF APPLICATION USER INTERFACE

(71) Applicant: PING AN TECHNOLOGY (SHENZHEN) CO., LTD., Shenzhen (CN)

(72) Inventor: Yun Gao, Shenzhen (CN)

(73) Assignee: PING AN TECHNOLOGY (SHENZHEN) CO., LTD., Shenzhen (CN)

(*) Notice: Subject to any disclaimer, the term of this patent is extended or adjusted under 35 U.S.C. 154(b) by 0 days.

(21) Appl. No.: 15/737,364

(22) PCT Filed: Feb. 28, 2017

(86) PCT No.: PCT/CN2017/075281
§ 371 (c)(1),
(2) Date: Dec. 18, 2017

(87) PCT Pub. No.: WO2017/148376
PCT Pub. Date: Sep. 8, 2017

(65) Prior Publication Data
US 2018/0189169 A1    Jul. 5, 2018

(30) Foreign Application Priority Data
Mar. 2, 2016    (CN) .......... 2016 1 01196047

(51) Int. Cl.
G06F 11/36    (2006.01)
(52) U.S. Cl.
CPC .......... *G06F 11/3684* (2013.01); *G06F 11/36* (2013.01); *G06F 11/3664* (2013.01)

(58) Field of Classification Search
CPC .................. G06F 11/3684; G06F 11/3664
See application file for complete search history.

(56) References Cited

U.S. PATENT DOCUMENTS 7,237,225 B2 * 6/2007 Kompalli .............. G06F 8/20
717/108
7,461,096 B1 * 12/2008 Hurren .................. G06F 8/60
(Continued)

FOREIGN PATENT DOCUMENTS

CN    1755647 A    4/2006
CN    101719092 A    6/2010
(Continued)

*Primary Examiner* — Chat C Do
*Assistant Examiner* — Douglas M Slachta
(74) *Attorney, Agent, or Firm* — Gokalp Bayramoglu (57) ABSTRACT

The present disclosure provides a method for automated testing of an application user interface, being implemented in an electronic apparatus, including: dividing a frame of a testing software application of an application user interface into a business requirement layer, a method definition layer, and a method implementation layer; when receiving a name modification request of modifying a name of one of the function controls, determining the process definition corresponding to the modified name according to the business requirement layer and the method definition layer; searching for a block of instructions corresponding to the determined process definition according to the method implantation layer; and searching for another name belonging to the same synonymous name set as the modified name in the found block of instructions, and replacing the found another name with the modified name.

12 Claims, 3 Drawing Sheets

(56) References Cited

U.S. PATENT DOCUMENTS

| | | | | |
|---|---|---|---|---|
| 7,702,649 B1* | 4/2010 | Bresch | ............ | G06F 17/30917 |
| | | | | 707/999.104 |
| 8,146,059 B2* | 3/2012 | Ponsford | ................... | G06F 8/20 |
| | | | | 717/124 |
| 8,583,754 B2* | 11/2013 | Nomura | ................. | G06Q 10/06 |
| | | | | 709/208 |
| 2002/0029378 A1* | 3/2002 | Larsson | ................ | G06F 9/4488 |
| | | | | 717/159 |
| 2010/0325492 A1* | 12/2010 | Isaacs | ................. | G06F 11/3664 |
| | | | | 714/38.1 |
| 2014/0089888 A1* | 3/2014 | Bhaskara | ................. | G06F 8/51 |
| | | | | 717/104 |
| 2014/0366005 A1* | 12/2014 | Kozhuharov | ....... | G06F 11/3696 |
| | | | | 717/125 |

FOREIGN PATENT DOCUMENTS

| | | |
|---|---|---|
| CN | 103186459 | 7/2013 |
| CN | 104699608 | 6/2015 |
| CN | 105930262 A | 9/2016 |

* cited by examiner

METHOD, ELECTRONIC APPARATUS, SYSTEM, AND STORAGE MEDIUM FOR AUTOMATED TESTING OF APPLICATION USER INTERFACE

CROSS REFERENCE OF RELATED APPLICATIONS

The present application is the national phase entry of international application no. PCT/CN2017/075281, filed on Feb. 28, 2017, which claims the benefit of priority from Chinese Application No. 201610119604.7, entitled "method and apparatus for automated testing of application user interface" filed on Mar. 2, 2016, the entire content of which is incorporated herein in its entirety.

TECHNICAL FIELD

The application relates to fields of testing technologies, and particularly, to a method, an electronic apparatus, a system, and a storage medium for automated testing of application user interface.

BACKGROUND

User interface (UI) refers to the whole design of human-computer interactions, operation logics, and interface aesthetic design of a software application. UI is a medium enabling interactions and exchanging of information between humans and machines; through UI, information having a machine-readable format can be transformed to that having a human-readable format. UI is also a tool which can enable the interactions between a user and a machine's hardware, allowing the user to operate the machine conveniently and efficiently and thus to finish the work by means of the hardware.

A good UI design not only personalizes the software application, but also comforts, simplifies, and frees the operation of the software application, fully showing the positioning and characteristics of the software application. With the rapid development of the computer's hardware, applications (software product) in the past cannot meet requirements from users. In the fierce market competition, an application cannot enable the company to win the market share only having powerful functions. Some companies begin to realize that UI design may become a large selling point of the software product. It is practically proved that the small input in the UI design such as the aesthetic design and usability of the software product brings large output, and the input-output ratio of the UI design is much greater than that of the development of leading functions of the software product.

Figure 1:
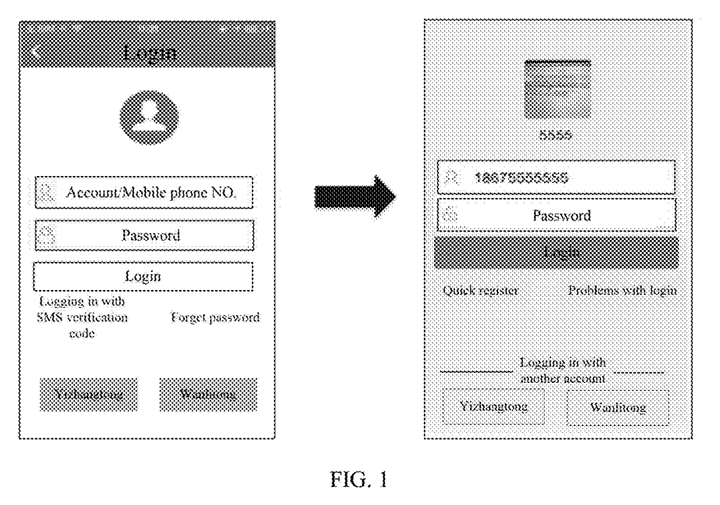
FIG. 1 is a schematic view for illustrating that a user interface of a software product is updated in prior art.

At present, when automated testing of a software UI is performed, as shown in FIG. 1, all the codes or instructions for implementing the automated testing need to be rewritten when new requirements appear or the software is updated. Thus, the automated testing of the software cannot be continuously performed conveniently and efficiently.

SUMMARY OF THE INVENTION

A method, an electronic apparatus, a system, and a storage medium for automated testing of application user interface are provided in the present disclosure, for preventing rewriting of codes or instructions for performing the automated testing of the application user interface when new requirements appear or the software is updated.

The method for automated testing of an application user interface, being implemented in an electronic apparatus, including:
- dividing a frame of a testing software application of an application user interface into a business requirement layer, a method definition layer, and a method implementation layer, wherein the business definition layer defines synonymous name sets for various function controls of the testing software application and business processes of different scenes to which the function controls correspond, the method definition layer maps the business requirement layer to define a process definition for each business process of the business requirement layer, and the method implementation layer maps the method definition layer to define a block of instructions for the process definition of each business process;
- when receiving a name modification request of modifying a name of one of the function controls from a user, determining the process definition corresponding to the modified name according to the business requirement layer and the method definition layer;
- searching for a block of instructions corresponding to the determined process definition according to the method implementation layer; and
- searching for another name belonging to the same synonymous name set as the modified name in the found block of instructions, and replacing the found another name with the modified name.

In some embodiments, the determining the process definition corresponding to the modified name according to the business requirement layer and the method definition layer includes:
- determining whether the modified name belongs to the synonymous name set defined in the business requirement layer or not; if the modified name belongs to the synonymous name set defined in the business requirement layer, searching for a business process corresponding to the modified name; determining the process definition corresponding to the found business process; if the modified name does not belong to the synonymous name set defined in the business requirement layer, generating first warning information to inform a user of adding the modified name into the corresponding synonymous name set and determining the process definition corresponding to the modified name after the modified name is added to the corresponding synonymous name set.

In some embodiments, the method further includes:
- when receiving a scene modification request of modifying a scene of one of the function controls, determining the business process corresponding to the modified scene according to the business requirement layer;
- searching for the process definition corresponding to the determined business process according to the method definition layer;
- searching for a block of instructions corresponding to the found process definition according to the method implementation layer; and
- replacing a block of instructions corresponding to the original scene with the found block of instructions in the testing software application.

In some embodiments, the determining the business process corresponding to the modified scene according to the business requirement layer includes:
- determining whether the modified scene is defined in the business requirement layer or not; if the modified scene is defined in the business requirement layer, determining the business process corresponding to the modified scene; if the modified scene is not defined in the business requirement layer, generating second warning information to inform a user of adding the process definition of the business process corresponding to the modified scene and adding the block of instructions of the process definition corresponding to the modified scene into the method implementation layer.

The electronic apparatus provided in the present disclosure includes a storage device and a processor; the storage device stores a system for automated testing of an application user interface which is capable of being executed by the processor to implement following steps:

dividing a frame of a testing software application of an application user interface into a business requirement layer, a method definition layer, and a method implementation layer, wherein the business definition layer defines synonymous name sets for various function controls of the testing software application and business processes of different scenes to which the function controls correspond, the method definition layer maps the business requirement layer to define a process definition for each business process of the business requirement layer, and the method implementation layer maps the method definition layer to define a block of instructions for the process definition of each business process;

when receiving a name modification request of modifying a name of one of the function controls from a user, determining the process definition corresponding to the modified name according to the business requirement layer and the method definition layer;

searching for a block of instructions corresponding to the determined process definition according to the method implementation layer; and searching for another name belonging to the same synonymous name set as the modified name in the found block of instructions, and replacing the found another name with the modified name.

In some embodiments, the determining the process definition corresponding to the modified name according to the business requirement layer and the method definition layer includes:

determining whether the modified name belongs to the synonymous name set defined in the business requirement layer or not; if the modified name belongs to the synonymous name set defined in the business requirement layer, searching for a business process corresponding to the modified name; determining the process definition corresponding to the found business process; if the modified name does not belong to the synonymous name set defined in the business requirement layer, generating first warning information to inform a user of adding the modified name into the corresponding synonymous name set and determining the process definition corresponding to the modified name after the modified name is added to the corresponding synonymous name set.

In some embodiments, the system for automated testing of an application user interface is further capable of being executed by the processor to perform steps of:

when receiving a scene modification request of modifying a scene of one of the function controls, determining the business process corresponding to the modified scene according to the business requirement layer;

searching for the process definition corresponding to the determined business process according to the method definition layer;

searching for a block of instructions corresponding to the found process definition according to the method implementation layer; and replacing a block of instructions corresponding to the original scene with the found block of instructions in the testing software application.

In some embodiments, the determining the business process corresponding to the modified scene according to the business requirement layer includes:

determining whether the modified scene is defined in the business requirement layer or not; if the modified scene is defined in the business requirement layer, determining the business process corresponding to the modified scene; if the modified scene is not defined in the business requirement layer, generating second warning information to inform a user of adding the process definition of the business process corresponding to the modified scene and adding the block of instructions of the process definition corresponding to the modified scene into the method implementation layer.

the system for automated testing of an application user interface provided in the present disclosure includes a dividing module, a determining module, and a name modification module;

the dividing module is configured to divide a frame of a testing software application of an application user interface into a business requirement layer, a method definition layer, and a method implementation layer, wherein the business definition layer defines synonymous name sets for various function controls and business processes of different scenes to which the function controls correspond, the method definition layer maps the business requirement layer to define a process definition for each business process of the business requirement layer, and the method implementation layer maps the method definition layer to define a block of instructions for the process definition of each business process;

the determining module is configured to determine whether a name modification request of modifying a name of one of the function controls is received from a user; and the name modification module is configured to:
when the name modification request is received, determine the process definition corresponding to the modified name according to the business requirement layer and the method definition layer;

search for a block of instructions corresponding to the determined process definition according to the method implementation layer; and according to the method implantation layer, search for another name belonging to the same synonymous name set as the modified name in the found block of instructions; and replace the another name with the modified name.

In some embodiments, the determine the process definition corresponding to the modified name according to the business requirement layer and the method definition layer includes:

determine whether the modified name belongs to the synonymous name set defined in the business requirement layer or not; if the modified name belongs to the synonymous name set defined in the business requirement layer, search for a business process corresponding to the modified name and determine the process definition corresponding to the found business process; if the modified name does not belong to the synonymous name set defined in the business requirement layer, generate first warning information to inform a user of adding the modified name into the corresponding synonymous name set and determine the process definition corresponding to the modified name after the modified name is added to the corresponding synonymous name set.

In some embodiments, the system further includes a scene modification module configured to:

when a scene modification request of modifying a scene of one of the function controls is received from a user, determine the business process corresponding to the modified scene according to the business requirement layer;

search for the process definition corresponding to the determined business process according to the method definition layer;

search for a block of instructions corresponding to the found process definition according to the method implementation layer; and replace a block of instructions corresponding to the original scene with the found block of instructions.

In some embodiments, the determine the business process corresponding to the modified scene according to the business requirement layer includes:

determine whether the modified scene is defined in the business requirement layer or not; if the modified scene is defined in the business requirement layer, determine the business process corresponding to the modified scene; if the modified scene is not defined in the business requirement layer, generate second warning information to inform a user of adding the process definition of the business process corresponding to the modified scene and adding the block of instructions of the process definition corresponding to the modified scene into the method implementation layer.

The non-volatile storage medium provided in the present disclosure is configured with computer readable program instructions stored thereon, wherein the computer readable program instructions are executed by one or more processors for:

dividing a frame of a testing software application of an application user interface into a business requirement layer, a method definition layer, and a method implementation layer, wherein the business definition layer defines synonymous name sets for various function controls and business processes of different scenes to which the function controls correspond, the method definition layer maps the business requirement layer to define a process definition for each business process of the business requirement layer, and the method implementation layer maps the method definition layer to define a block instructions for the process definition of each business process;

when receiving a name modification request of modifying a name of one of the function controls, determining the process definition corresponding to the modified name according to the business requirement layer and the method definition layer;

searching for a block of instructions corresponding to the determined process definition according to the method implementation layer; and searching for another name belonging to the same synonymous name set as the modified name in the found block of instructions, and replacing the found another with the modified name.

In some embodiments, the determining the process definition corresponding to the modified name according to the business requirement layer and the method definition layer includes:

determining whether the modified name belongs to the synonymous name set defined in the business requirement layer or not; if the modified name belongs to the synonymous name set defined in the business requirement layer, searching for a business process corresponding to the modified name; determining the process definition corresponding to the found business process; if the modified name does not belong to the synonymous name set defined in the business requirement layer, generating first warning information to inform a user of adding the modified name into the corresponding synonymous name set and determining the process definition corresponding to the modified name after the modified name is added to the corresponding synonymous name set.

In some embodiments, the program instructions are further executed by the one or more processor for:

when receiving a scene modification request of a scene of one of the function controls, determining the business process corresponding to the modified scene according to the business requirement layer;

searching for the process definition corresponding to the determined business process according to the method definition layer;

searching for a block of instructions corresponding to the found process definition according to the method implementation layer; and replacing a block of instructions corresponding to the original scene with the found block of instructions.

In some embodiments, the determining the business process corresponding to the modified scene according to the business requirement layer includes:

determining whether the modified scene is defined in the business requirement layer or not; if the modified scene is defined in the business requirement layer, determining the business process corresponding to the modified scene; if the modified scene is not defined in the business requirement layer, generating second warning information to inform a user of adding the process definition of the business process corresponding to the modified scene and adding the block of instructions of the process definition corresponding to the modified scene in the method implementation layer.

With the method, system, electronic apparatus, and storage medium for automated testing of application user interface, when new requirements appear or the application is updated, rewriting of the codes for performing the automated testing can be avoided, thus, the time required for the automated testing is reduced and the efficiency is improved.

BRIEF DESCRIPTION OF THE DRAWINGS

The present disclosure will be described in more detail with reference to the accompany drawings and the embodiments, wherein in the drawings.

DETAILED DESCRIPTION OF THE INVENTION

For clearly understanding technical features, purpose, and effect of the present disclosure, embodiments are given in detail hereinafter with reference to the accompanying drawings.

Figure 2:
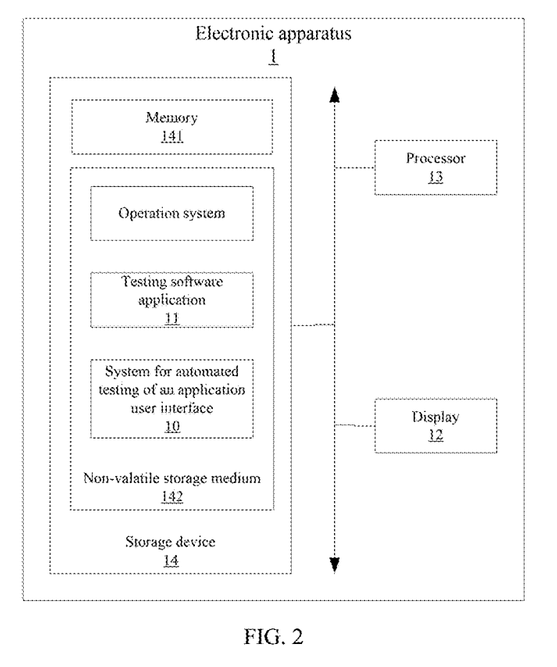
FIG. 2 is an exemplary structural schematic diagram illustrating a hardware environment for implementing a system for automated testing of an application user interface in accordance with an embodiment of the present disclosure.

Referring to FIG. 2, which is an exemplary structural schematic diagram illustrating a hardware environment for implementing a system 10 for automated testing of an application user interface in accordance with an embodiment of the present disclosure, the system 10 for automated testing of an application user interface can be installed and implemented in an electronic apparatus 1. In some embodiments, the electronic apparatus 1 can be a server or a personal computer such as a tablet computer, a desktop computer, and a notebook computer. In other embodiments, the electronic apparatus 1 can be any suitable electronic apparatus.

A testing software application 11 of one or more application user interfaces is installed in the electronic apparatus 1. For each application, the user interface provides the whole design including human-machine interactions, operation logics, and interface aesthetic design of the application, and enables the whole design to be displayed on a display 12.

The electronic apparatus 1 includes a processor 13 and a storage device 14 connected to the processor 13 through a system bus. The processor 13 is configured to perform calculation and control functions to support operation of the whole entire electronic apparatus 1. In some embodiments, the storage device 14 stores the testing software application 11, an operation system, and the system 10. The storage device 14 may include a memory (eg., random access memory) and a non-volatile storage medium; the non-volatile storage medium stores the operation system, the system 10, and the testing software application 11; and the memory provides a caching operation environment for the operation system, the system 10, and the testing software application 11. In some embodiment, the system 10 includes at least one computer executable program instruction; the at least one computer executable program instruction can be executed by the processor 13 to implement the method for automated testing of an application user interface, which is given in detail in the following description.

It is understood that FIG. 2 is only exemplary to show the structure of the electronic apparatus 1 associated with an embodiment of the present disclosure and is not intended to limit the electronic apparatus 1 to this embodiment. In other embodiments, the electronic apparatus 1 may include more or fewer parts, or combine certain parts, or have different arrangement of these parts shown in FIG. 2.

Figure 3:
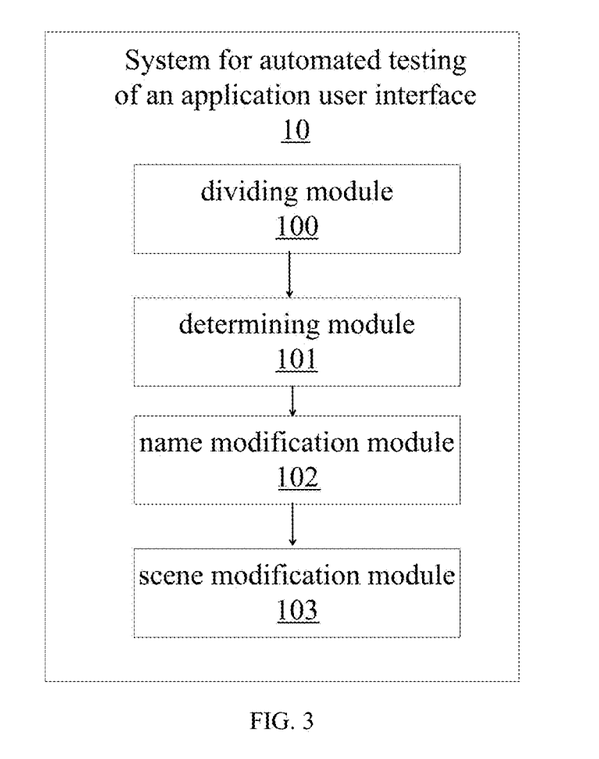
FIG. 3 is an exemplary functional block diagram illustrating a system for automated testing of an application user interface in accordance with an embodiment of the present disclosure.

Referring to FIG. 3, which is an exemplary functional block diagram illustrating the system 10 for automated testing of an application user interface in accordance with an embodiment of the present disclosure, the system 10 may include multiple functional blocks based on functions of difference parts of program instructions. In an embodiment, the system 10 may include a dividing module 100, a determining module 101, and a name modification module 102.

The dividing module 100 is configured to divide a frame of the testing software application 11 into a business requirement layer, a method definition layer, and a method implementation layer.

The business requirement layer defines synonymous name sets for various function controls of the testing software applications, for example, "Logout", "Logoff", and "Login again" can be included in one synonymous name set, and "Forget password" and "Problems on login" can be included in another synonymous name set. The various function controls are defined to correspond to business processes of different scenes. For example, if the scene corresponding to a logoff control is "logging off", the business process corresponding to the "logging off" scene can be: "when a logoff instruction is received, if a user has logged in the system, logging off the user from the system"; if the scene corresponding to the logoff control is "prompt the user that history data won't be deleted when the user logs off from the system", the business process corresponding to the scene can be: "when a logoff instruction is received, if the user has logged in the system, outputting warning information to confirm with the user whether or not to log off from the system; when a confirming instruction is received, successfully logging off the user from the system". The business requirement layer describes requirements in descriptive language; meanwhile, the requirements are also examples of testing scenes, thus, functions of different business processes of the same function control can be collected in the same business requirement layer. For example, "logging in with correct username and password", "logging in with correct username and incorrect password", and "logging in with incorrect username and password" are different scenes of the login control, and the business processes corresponding to the different scenes of the login control can be collected in the same business requirement layer to reflect the business processes of the login control.

The method definition layer maps the business requirement layer. The method definition layer defines a business definition for each business process of the business requirement layer and defines the resolution and implementation of the descriptive language of the business requirement layer.

The method implementation layer maps the method definition layer. The method implementation layer provides the specific operation for implementing the method and defines a block of instructions for the process definition of each business process.

The determining module 101 is configured to receive a modification request of modifying the software application 11 from the user and determines a type of the modification request. The modification request may be a name modification request of modifying a name of a function control or a scene modification request of modifying a scene of a function control.

The name modification module 102 is configured to, when the name modification request from the user is received, determine the process definition corresponding to the modified name of the control according to the business requirement layer and the method definition layer, search for the block of instructions corresponding to the determined process definition according to the method implementation layer, search for another name belonging to the same synonymous name set as the modified name from the found block of instructions, and replace the found another name with the modified name.

In some embodiments, the system 10 for automated testing of an application user interface may further include a scene modification module 103. The scene modification module 103 is configured to determine, when the scene modification request from the user is received, a business process corresponding to the modified scene according to the business requirement layer; search for a process definition corresponding to the found business process; search for a block of instructions corresponding to the found process definition; and replace the block of instructions corresponding to the original scene with the found block of instructions.

Figure 4:
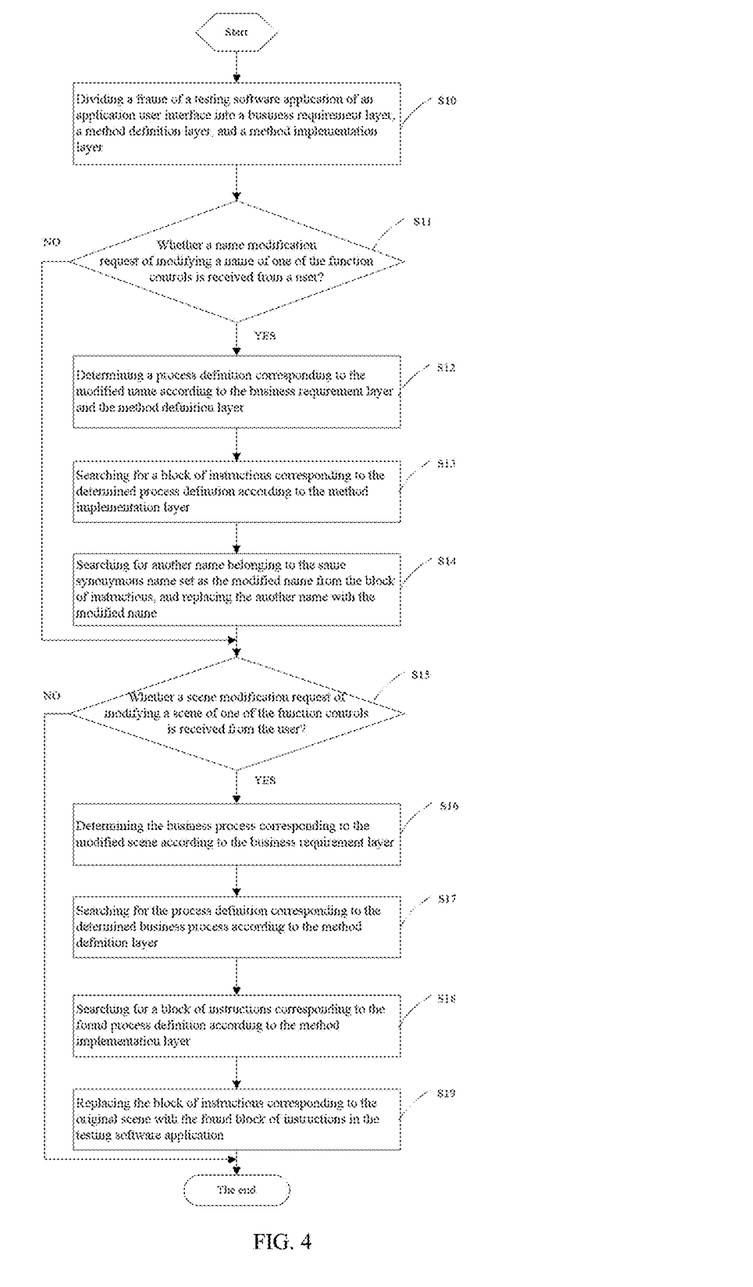
FIG. 4 is an exemplary process flow diagram illustrating a method for automated testing of an application user interface in accordance with an embodiment of the present disclosure.

FIG. 4 is an exemplary process flow diagram illustrating a method for automated testing of an application user interface in accordance with an embodiment of the present disclosure. It is understood the method of the present disclosure is not limited to this embodiment; in other embodiments, the method can include more less steps, or the sequence of the steps can be changed accordingly. The method includes steps as follows.

Step S10, dividing, by a dividing module 100, a frame of a testing software application of an application user interface into a business requirement layer, a method definition layer, and a method implementation layer.

The business requirement layer defines synonymous name sets for various function controls of a testing software application, for example, "Logout", "Logoff", and "Login again" can be included in one synonymous name set, and "Forget password" and "Problems on login" can be included in another synonymous name set. The various function controls are defined to correspond to business processes of different scenes. For example, if the scene corresponding to a logoff control is "logging off", the business process corresponding to the "logging off" scene can be: "when a logoff instruction is received, if a user has logged in the system, logging off the user from the system"; if the scene corresponding to the logoff control is "prompt the user that history data won't be deleted when the user logs off from the system", the business process corresponding to the scene can be: "when a logoff instruction is received, if the user has logged in the system, outputting a warning information to confirm with the user whether or not to log off from the system; when a confirming instruction is received, successfully logging off the user from the system". The business requirement layer describes requirements in descriptive language; meanwhile, the requirements are also examples of testing scenes, thus, functions of different business processes of the same function control can be collected in the same business requirement layer. For example, "logging in with correct username and password", "logging in with correct username and incorrect password", and "logging in with incorrect username and password" are different scenes of the login control, and the business processes corresponding to the different scenes of the login control can be collected in the same business requirement layer to reflect the business processes of the login control.

The method definition layer maps the business requirement layer. The method definition layer defines a business definition for each business process of the business requirement layer and defines the resolution and implementation of the descriptive language of the business requirement layer.

The method implementation layer maps the method definition layer. The method implementation layer provides the specific operation for implementing the method and defines a block of instructions for the process definition of each business process.

Step S11, determining, by a determining module 101, whether a name modification request of modifying a name of a function control of the testing software application 11 from the user is received; if the name modification request is received, performing steps S12 to S14; if the name modification request is not received, performing step S15.

Step 12, determining, by a name modification module 102, a process definition corresponding to the modified name of the function control according to the business requirement layer and the method definition layer. In some embodiments, the determination of the process definition includes: determining whether the modified name belongs to the synonymous name set defined in the business requirement layer or not; if the modified name belongs to the synonymous name set defined in the business requirement layer, searching for a business process corresponding to the modified name; determining the process definition corresponding to the found business process; if the modified name does not belong to the synonymous name set defined in the business requirement layer, generating first warning information to inform the user of adding the modified name into the corresponding synonymous name set and determining the process definition corresponding to the modified name after the modified name is added into the corresponding synonymous name set.

Step S13, searching for, by the name modification module 102, a block of instructions corresponding to the determined process definition.

Step S14, searching for, by the name modification module 102, another name belonging to the same synonymous name set as the modified name from the block of instructions, and replacing the another name with the modified name.

Step S15, determining, by the determining module 101, whether a scene modification request of modifying a scene of a function control of the testing software application 11 from the user is received; if the scene modification request is received, performing steps S16 to S19; otherwise, the process ends.

Step S16, determining, by the scene modification module 103, the business process corresponding to the modified scene according to the business requirement layer. In some embodiments, the determination of the business process corresponding to the modified scene includes: determining whether the modified scene is defined in the business requirement layer or not; if the modified scene is defined in the business requirement layer, determining the business process corresponding to the modified scene; if the modified scene is not defined in the business requirement layer, generating second warning information to inform the user of adding the process definition of the business process corresponding to the modified scene and adding a block of instructions of the process definition corresponding to the modified scene in the method implementation layer.

Step S17, searching for the process definition corresponding to the determined business process according to the method definition layer.

Step S18, searching for a block of instructions corresponding to the found process definition according to the method implementation layer.

Step S19, replacing the block of instructions corresponding to the original scene with the found block of instructions in the testing software application 11.

It will be understood by those of ordinary skill in the art that all steps or some steps of the process in the method of the above embodiments may be implemented by instructing the corresponding hardware through a computer program which may be stored in a computer readable storage medium. In execution of the program, the processes of the methods of the above embodiments are implemented. The storage medium may be a non-volatile storage medium such as a magnetic disk, an optical disk, a read-only memory (ROM), or a random access memory (RAM).

The technical features of the embodiments described above can be combined in any way, and in order to make the description simple, all possible combinations of the respective technical features in the above embodiments are not described herein. However, any of the combinations without contradiction should be within the scope of the present disclosure.

The contents described above are only preferred embodiments of the present disclosure, but the scope of the present disclosure is not limited to the embodiments. Any ordinarily skilled in the art would make any modifications or replacements to the embodiments in the scope of the present disclosure, and these modifications or replacements should be included in the scope of the present disclosure. Thus, the scope of the present disclosure should be subjected to the claims.

What is claimed is:

1. A method for automated testing of an application user interface, being implemented in an electronic apparatus, comprising:
    dividing a frame of a testing software application of an application user interface into a business requirement layer, a method definition layer, and a method implementation layer, wherein the business definition layer defines synonymous name sets for various function controls of the testing software application and business processes of different scenes to which the function controls correspond, the method definition layer maps the business requirement layer to define a process definition for each business process of the business requirement layer, and the method implementation layer maps the method definition layer to define a block of instructions for the process definition of each business process;
    receiving a name modification request of modifying a name of one of the function controls from a user, determining the process definition corresponding to the modified name according to the business requirement layer and the method definition layer;
    searching for a block of instructions corresponding to the determined process definition according to the method implementation layer; and
    searching for another name belonging to the same synonymous name set as the modified name in the found block of instructions, and replacing the found another name with the modified name.

2. The method of claim 1, wherein the determining the process definition corresponding to the modified name according to the business requirement layer and the method definition layer comprises:
    determining whether the modified name belongs to the synonymous name set defined in the business requirement layer or not;
    if the modified name belongs to the synonymous name set defined in the business requirement layer, searching for a business process corresponding to the modified name; and
    determining the process definition corresponding to the found business process;
    if the modified name does not belong to the synonymous name set defined in the business requirement layer, generating first warning information to inform a user of adding the modified name into the corresponding synonymous name set and determining the process definition corresponding to the modified name after the modified name is added to the corresponding synonymous name set.

3. The method of claim 1, further comprising:
    receiving a scene modification request of modifying a scene of one of the function controls, determining the business process corresponding to the modified scene according to the business requirement layer;
    searching for the process definition corresponding to the determined business process according to the method definition layer;
    searching for a first block of instructions corresponding to the found process definition according to the method implementation layer; and
    replacing a second block of instructions corresponding to the original scene with the first block of instructions in the testing software application.

4. The method of claim 3, wherein the determining the business process corresponding to the modified scene according to the business requirement layer comprises:
    determining whether the modified scene is defined in the business requirement layer or not;
    if the modified scene is defined in the business requirement layer, determining the business process corresponding to the modified scene;
    if the modified scene is not defined in the business requirement layer, generating second warning information to inform a user of adding the process definition of the business process corresponding to the modified scene and adding the block of instructions of the process definition corresponding to the modified scene into the method implementation layer.

5. An electronic apparatus, comprising:
    a storage device and a processor;
    the storage device stores a system for automated testing of an application user interface, wherein the application user interface is executed by the processor to implement following steps:
    dividing a frame of a testing software application of an application user interface into a business requirement layer, a method definition layer, and a method implementation layer, wherein the business definition layer defines synonymous name sets for various function controls of the testing software application and business processes of different scenes to which the function controls correspond, the method definition layer maps the business requirement layer to define a process definition for each business process of the business requirement layer, and the method implementation layer maps the method definition layer to define a block of instructions for the process definition of each business process;
    receiving a name modification request of modifying a name of one of the function controls from a user, determining the process definition corresponding to the modified name according to the business requirement layer and the method definition layer;
    searching for a block of instructions corresponding to the determined process definition according to the method implementation layer; and
    searching for another name belonging to the same synonymous name set as the modified name in the found block of instructions, and replacing the found another name with the modified name.

6. The apparatus of claim 5, wherein the determining the process definition corresponding to the modified name according to the business requirement layer and the method definition layer comprises:
   determining whether the modified name belongs to the synonymous name set defined in the business requirement layer or not;
   if the modified name belongs to the synonymous name set defined in the business requirement layer, searching for a business process corresponding to the modified name; and determining the process definition corresponding to the found business process;
   if the modified name does not belong to the synonymous name set defined in the business requirement layer, generating first warning information to inform a user of adding the modified name into the corresponding synonymous name set and determining the process definition corresponding to the modified name after the modified name is added to the corresponding synonymous name set.

7. The apparatus of claim 5, wherein the system for automated testing of an application user interface is further capable of being executed by the processor to perform steps of:
   receiving a scene modification request of modifying a scene of one of the function controls, determining the business process corresponding to the modified scene according to the business requirement layer;
   searching for the process definition corresponding to the determined business process according to the method definition layer;
   searching for a first block of instructions corresponding to the found process definition according to the method implementation layer; and
   replacing a second block of instructions corresponding to the original scene with the first block of instructions in the testing software application.

8. The apparatus of claim 7, wherein the determining the business process corresponding to the modified scene according to the business requirement layer comprises:
   determining whether the modified scene is defined in the business requirement layer or not; if the modified scene is defined in the business requirement layer, determining the business process corresponding to the modified scene; if the modified scene is not defined in the business requirement layer, generating second warning information to inform a user of adding the process definition of the business process corresponding to the modified scene and adding the block of instructions of the process definition corresponding to the modified scene into the method implementation layer.

9. A system for automated testing of an application user interface, wherein the system comprises a processor and a memory connected to the processor, wherein the memory stores a dividing module, a determining module, and a name modification module;
   the dividing module is configured to divide a frame of a testing software application of an application user interface into a business requirement layer, a method definition layer, and a method implementation layer, wherein the business definition layer defines synonymous name sets for various function controls and business processes of different scenes to which the function controls correspond, the method definition layer maps the business requirement layer to define a process definition for each business process of the business requirement layer, and the method implementation layer maps the method definition layer to define a block of instructions for the process definition of each business process;
   the determining module is configured to determine a name modification request of modifying a name of one of the function controls is received from a user; and
   the name modification module is configured to:
   upon receiving the name modification request, determine the process definition corresponding to the modified name according to the business requirement layer and the method definition layer;
   search for a block of instructions corresponding to the determined process definition according to the method implementation layer; and
   according to the method implantation layer, search for another name belonging to the same synonymous name set as the modified name in the found block of instructions; and
   replace the another name with the modified name.

10. The system of claim 9, wherein the determine the process definition corresponding to the modified name according to the business requirement layer and the method definition layer comprises:
    determine whether the modified name belongs to the synonymous name set defined in the business requirement layer or not;
    if the modified name belongs to the synonymous name set defined in the business requirement layer, search for a business process corresponding to the modified name and determine the process definition corresponding to the found business process;
    if the modified name does not belong to the synonymous name set defined in the business requirement layer, generate first warning information to inform a user of adding the modified name into the corresponding synonymous name set and determine the process definition corresponding to the modified name after the modified name is added to the corresponding synonymous name set.

11. The system of claim 9, further comprising a scene modification module configured to:
    receive a scene modification request of modifying a scene of one of the function controls from a user, determine the business process corresponding to the modified scene according to the business requirement layer;
    search for the process definition corresponding to the determined business process according to the method definition layer;
    search for a first block of instructions corresponding to the found process definition according to the method implementation layer; and
    replace a second block of instructions corresponding to the original scene with the first block of instructions.

12. The system of claim 11, wherein the determine the business process corresponding to the modified scene according to the business requirement layer comprises:
    determine whether the modified scene is defined in the business requirement layer or not; if the modified scene is defined in the business requirement layer, determine the business process corresponding to the modified scene; if the modified scene is not defined in the business requirement layer, generate second warning information to inform a user of adding the process definition of the business process corresponding to the modified scene and adding the block of instructions of the process definition corresponding to the modified scene into the method implementation layer.

* * * * *